(12) United States Patent
Little et al.

(10) Patent No.: US 7,483,950 B2
(45) Date of Patent: *Jan. 27, 2009

(54) SYSTEM AND METHOD FOR PROVIDING SECURE MESSAGE SIGNATURE STATUS AND TRUST STATUS INDICATION

(75) Inventors: Herbert A. Little, Waterloo (CA); Michael S. Brown, Heidelberg (CA); Neil P. Adams, Waterloo (CA)

(73) Assignee: Research In Motion Limited, Waterloo (CA)

( * ) Notice: Subject to any disclaimer, the term of this patent is extended or adjusted under 35 U.S.C. 154(b) by 137 days.

This patent is subject to a terminal disclaimer.

(21) Appl. No.: 11/525,701

(22) Filed: Sep. 22, 2006

(65) Prior Publication Data

US 2007/0022295 A1    Jan. 25, 2007

Related U.S. Application Data

(63) Continuation of application No. 10/092,325, filed on Mar. 6, 2002, now Pat. No. 7,130,886.

(51) Int. Cl.
*G06F 12/14* (2006.01)
*H04L 9/32* (2006.01)

(52) U.S. Cl. .................. 709/206; 726/4; 713/176

(58) Field of Classification Search ........... 709/206, 709/225; 726/4–5; 713/168, 170, 176
See application file for complete search history.

(56) References Cited

U.S. PATENT DOCUMENTS

| | | | |
|---|---|---|---|
| 5,948,058 | A | 9/1999 | Kudoh et al. |
| 6,314,190 | B1 | 11/2001 | Zimmermann |
| 6,763,389 | B2 | 7/2004 | Kryskow, Jr. |
| 6,796,489 | B2 | 9/2004 | Slater et al. |
| 6,851,054 | B2 | 2/2005 | Wheeler et al. |
| 7,130,886 | B2 * | 10/2006 | Little et al. .............. 709/206 |

FOREIGN PATENT DOCUMENTS

| | | |
|---|---|---|
| EP | 0 785 514 A1 | 7/1997 |
| EP | 1 265 182 A2 | 12/2002 |
| FR | 2791203 | 9/2000 |
| WO | WO 99/08415 | 2/1999 |

(Continued)

OTHER PUBLICATIONS

Stallings W.: "The PGP Web of Trust", BYTE, McGraw-Hill Inc., St. Peterborough, USA, Feb. 1, 1995, pp. 161 to 162, XP-494702.

(Continued)

*Primary Examiner*—Larry D Donaghue
(74) *Attorney, Agent, or Firm*—Jones Day; Krishna K. Pathiyal; Robert C. Liang

(57) ABSTRACT

A system and method for providing secure message signature status and trust status indications are disclosed. When a secure message having a digital signature generated by a sender is selected for processing on a messaging client, the digital signature on the message and trust status of the sender are checked. Separate indications are then provided to indicate the results of checking the digital signature and the trust status of the sender.

36 Claims, 5 Drawing Sheets

FOREIGN PATENT DOCUMENTS

| | | |
|---|---|---|
| WO | WO 99/64946 | 12/1999 |
| WO | WO 01/26401 A1 | 4/2001 |

OTHER PUBLICATIONS

Schneier, Bruce: "Applied Cryptography, Second Edition" 1996, John Wiley & Sons, Inc., New York, pp. 38-39.

PGP Freeware for Windows; User's Guide, Version 7.0, (Jan. 2001).

Chadwick D. et al: "Merging and Extending the PGP and PEM Trust Models—The ICE-TEL Trust Model," IEEE Network, New York, USA 01, May 1997, pp. 16 to 24, XP-689785.

Caronni G.: "Walking the Web of Trust," Enabling Technologies: Infrastructure for Collaborative Enterprises, 2000. (Wet ICE 2000). Proceedings. IEEE 9th International Workshops on Gaithersburg, MD, USA, Los Alamitos, CA, USA, Jun. 14, 2000-Jun. 16, 2000, pp. 153 to 158, XP-10522927.

Preneel B: "Cryptographic Hash Functions" European Transactions on Telecommunications and Related Technologies, vol. 5, No. 4 (Jul. 1, 1994), pp. 17-34, XP000460559.

Herda, S.: "Non-Repudiation: Constituting Evidence and Proof in Digital Cooperation," Computer Standards and Interfaces, vol. 17, No. 1, pp. 69-79, 1995 Elsevier Science B.V.

* cited by examiner

SYSTEM AND METHOD FOR PROVIDING SECURE MESSAGE SIGNATURE STATUS AND TRUST STATUS INDICATION

CROSS REFERENCE TO RELATED APPLICATION

This application is a continuation of U.S. patent application Ser. No. 10/092,325, which was filed on Mar. 6, 2002, now U.S. Pat. No. 7,130,886 and is titled "System and Method for Providing Secure Message Signature Status and Trust Status Indication." By this reference, the full disclosure, including the drawings, of U.S. patent application Ser. No. 10/092,325 is incorporated herein by reference.

BACKGROUND

1. Field of the Invention

This invention relates generally to the field of secure electronic messaging, and in particular to processing secure messages to verify and separately indicate signature status and trust status of the messages.

2. Description of the Related Art

Known secure messaging software clients, such as e-mail software applications operating on desktop computer systems, represent the status of a signature on a received secure message using a single icon or other type of signature indicator that indicates whether the signature is valid or not. The overall process of signature verification by these clients typically involves multiple operations, such as mathematical operations to verify the signature status, and a check of trust status. When signature verification fails, however, a user of these known clients is unable to immediately determine the reason for the failure, and which of the signature verification operations failed, due to the fact that the client only provides a single signature verification indicator (i.e. valid or invalid). Therefore, when a signature verification process fails, the user cannot distinguish whether the failure was caused by a mathematical operation failure or by a trust status check failure.

SUMMARY

A method of indicating signature status and trust status of a secure message on a messaging client is provided. The method may include the steps of selecting for processing a secure message stored on the messaging client, the secure message including a digital signature generated by a sender of the secure message, checking the digital signature, checking trust status of the sender, displaying a first indicator of a result of the step of checking the digital signature, and displaying a second indicator of a result of the step of checking trust status of the sender.

A system for indicating signature status and trust status of a secure message is also provided. The system may include a messaging client configured to receive secure messages, each of the secure messages including a digital signature generated by a sender of the secure message, an input configured to receive inputs from a user of the messaging client, a data processor, and an output configured to provide outputs to the user. When a received secure message is selected for processing by the user via the input, the processor checks the digital signature on the selected secure message, checks the trust status of the sender, and provides separate output indications of the results of the digital signature check and the trust status check on the output.

DETAILED DESCRIPTION

Signature and trust status checking may be performed on secure messages that have at least been signed with a digital signature. A secure message may also be processed in other ways by a message sender or intermediate system between a message sender and a messaging client which receives the secure message. For example, a secure message may be a message that has been signed, encrypted and then signed or signed and then encrypted by a message sender according to variants of Secure Multipurpose Internet Mail Extensions (S/MIME). A secure message could similarly be encoded, compressed or otherwise processed either before or after being signed. Any such processing of a secure message would be reversed at a message receiver if necessary before signature verification operations are performed.

A messaging client allows a system on which it operates to receive and possibly also send messages. Messaging clients may operate on a computer system, a handheld device, or any other system or device with communications capabilities. Many messaging clients also have additional non-messaging functions.

Figure 1:
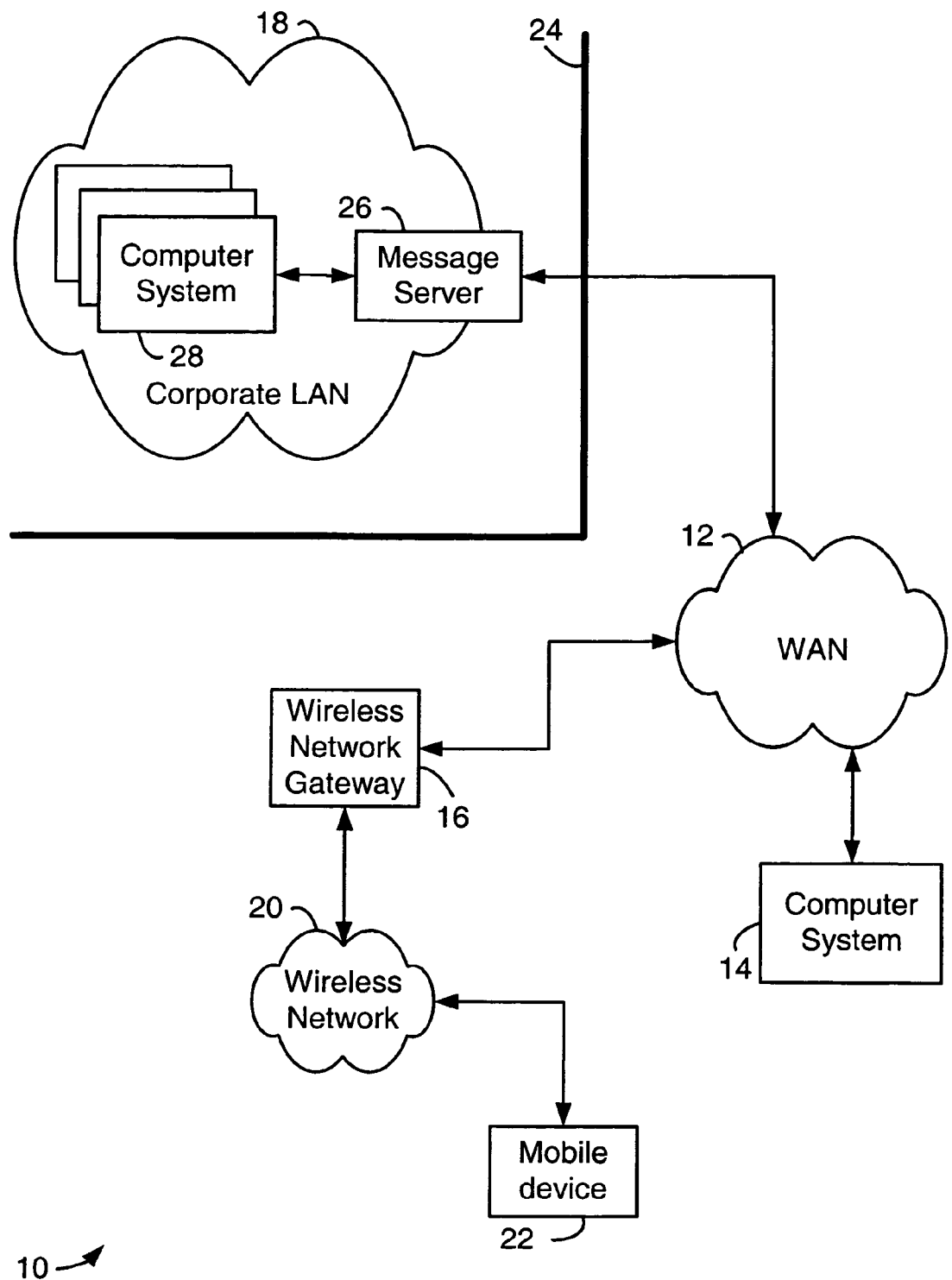
FIG. 1 is a block diagram of an exemplary messaging system in which the present invention may be implemented.

FIG. 1 is a block diagram of an exemplary messaging system in which the present invention may be implemented. The system 10 includes a Wide Area Network (WAN) 12, coupled to a computer system 14, a wireless network gateway 16, and a corporate Local Area Network (LAN) 18. The wireless network gateway 16 is also coupled to a wireless communication network 20, in which a wireless mobile communication device 22 ("mobile device") is configured to operate.

The computer system 14 may be a desktop or laptop personal computer (PC), which is configured to communicate to the WAN 12, which may be the Internet. PCs, such as computer system 14, normally access the Internet through an Internet Service Provider (ISP), an Application Service Provider (ASP), or the like.

The corporate LAN 18 is an example of a network-based messaging client. It is normally located behind a security firewall 24. Within the corporate LAN 30, a message server 26, operating on a computer behind the firewall 24 serves as the primary interface for the corporation to exchange messages both within the LAN 18, and with other external messaging clients via the WAN 12. Two known message servers 26 are Microsoft™ Exchange server and Lotus Domino™ server. These servers 26 are often used in conjunction with Internet mail routers that typically use UNIX-based Sendmail protocols to route and deliver mail messages. The message server 26 may also provide additional functionality, such as dynamic database storage for calendars, todo lists, task lists, e-mail, electronic documentation, etc.

The message server 26 provides messaging capabilities to the corporation's networked computer systems 28 coupled to the LAN 18. A typical LAN 18 includes multiple computer systems 28, each of which implements a messaging client, such as Microsoft Outlook™, Lotus Notes, etc. Within the LAN 18, messages are received by the message server 26, distributed to the appropriate mailboxes for user accounts addressed in the received message, and are then accessed by a user through a computer system 28 operating as a messaging client.

The wireless gateway 16 provides an interface to a wireless network 20, through which messages may be exchanged with a mobile device 22. Such functions as addressing of the mobile device 22, encoding or otherwise transforming messages for wireless transmission, and any other required interface functions may be performed by the wireless gateway 16. The wireless gateway may be configured to operate with more than one wireless network 20, in which case the wireless gateway 16 may also determine a most likely network for locating a given mobile device user and may also track users as they roam between countries or networks.

Any computer system 14, 28 with access to the WAN 12 may exchange messages with a mobile device 22 through the wireless network gateway 16. Alternatively, private wireless network gateways, such as wireless Virtual Private Network (VPN) routers could also be implemented to provide a private interface to a wireless network. For example, a wireless VPN implemented in the LAN 18 may provide a private interface from the LAN 18 to one or more mobile devices 22 through the wireless network 20. Such a private interface to mobile devices 22 via the wireless network gateway 16 and/or the wireless network 20 may also effectively be extended to entities outside the LAN 18 by providing a message forwarding or redirection system that operates with the message server 26. Such a redirection system is disclosed in U.S. Pat. No. 6,219,694, which is hereby incorporated into this application by reference. In this type of redirection system, incoming messages received by the message server 26 and addressed to a user of a mobile device 22 are sent through the wireless network interface, either a wireless VPN router, wireless gateway 16 or other interface, to the wireless network 20 and to the user's mobile device 22. Another alternate interface to a user's mailbox on a message server 26 may be a Wireless Application Protocol (WAP) gateway. Through a WAP gateway, a list of messages in a user's mailbox on the message server 26, and possibly each message or a portion of each message, could be sent to the mobile device 22.

A wireless network 20 normally delivers messages to and from mobile devices 22 via RF transmissions between base stations and mobile devices 22. The wireless network 20 may for example be: (1) a data-centric wireless network, (2) a voice-centric wireless network, or (3) a dual-mode network that can support both voice and data communications over the same infrastructure. Recently developed wireless networks include: (1) the Code Division Multiple Access (CDMA) network, (2) the Groupe Special Mobile or the Global System for Mobile Communications (GSM) and the General Packet Radio Service (GPRS) networks, both developed by the standards committee of CEPT, and (3) third-generation (3G) networks, such as Enhanced Data rates for Global Evolution (EDGE) and Universal Mobile Telecommunications Systems (UMTS), which are currently under development.

GPRS is a data overlay on top of the existing GSM wireless network, which is used in many parts of the world. Examples of data-centric network include: (1) the Mobitex™ Radio Network ("Mobitex"), and (2) the DataTAC™ Radio Network ("DataTAC"). Examples of known voice-centric data networks include Personal Communication Systems (PCS) networks like CDMA, GSM, and Time Division Multiple Access (TDMA) systems that have been available in North America and world-wide for nearly 10 years.

The mobile device 22 may be a data communication device, a voice communication device, or a multiple-mode device capable of voice, data and other types of communications. An exemplary mobile device 22 is described in further detail below.

Perhaps the most common type of messaging currently in use is e-mail. In a standard e-mail system, an e-mail message is sent by an e-mail sender, possibly through a message server and/or a service provider system, and may then be routed through the Internet to one or more message receivers. E-mail messages are normally sent in the clear and typically use Simple Mail Transfer Protocol (SMTP) headers and Multipurpose Internet Mail Extensions (MIME) body parts to define the format of the e-mail message.

In recent years, secure messaging techniques have evolved to protect both the content and integrity of messages, such as e-mail messages. S/MIME and Pretty Good Privacy™ (PGP™) are two public key secure e-mail messaging protocols that provide for both encryption, to protect data content, and signing, which protects the integrity of a message and provides for sender authentication by a message receiver. In addition to utilizing digital signatures and possibly encryption, secure messages may also or instead be encoded, compressed or otherwise processed.

Figure 2:
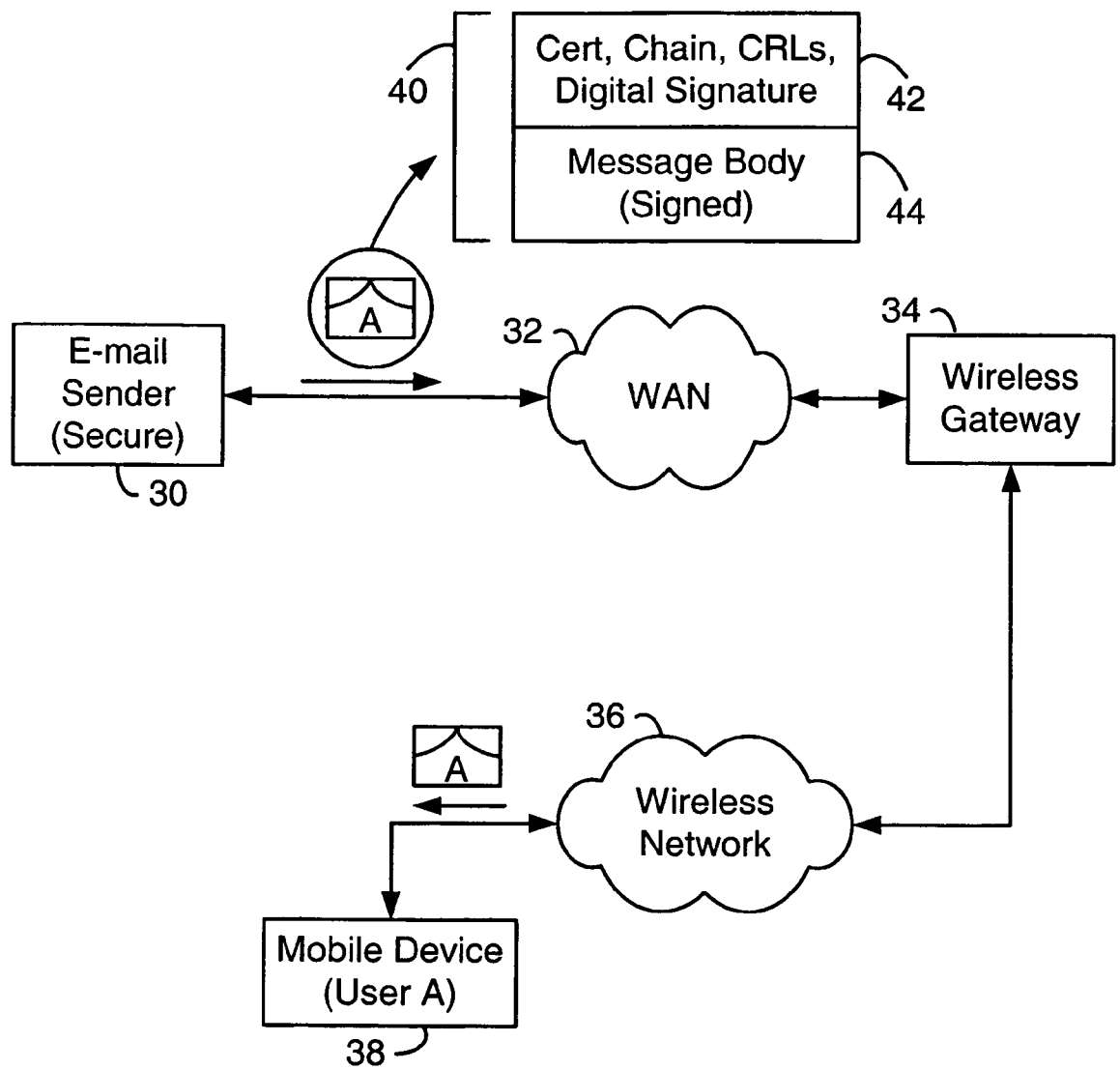
FIG. 2 is a block diagram illustrating a secure e-mail message exchange in a messaging system.

FIG. 2 is a block diagram illustrating a secure e-mail message exchange in a messaging system. The system includes an e-mail sender 30, coupled to a WAN 32, and a wireless gateway 34, which provides an interface between the WAN 32 and a wireless network 36. A mobile device 38 is adapted to operate within the wireless network 36.

The e-mail sender 30 may be a PC, such as the system 14 in FIG. 1, or it may be a network-connected computer, such as computer 28. The e-mail sender 30 may also be a mobile device on which e-mail messages may be composed and sent. The WAN 32, wireless gateway 34, wireless network 36 and mobile device 38 are substantially the same as similarly-labelled components in FIG. 1.

A secure e-mail message sender 30 typically signs a message by taking a digest of the message and signing the digest using the sender's private key. A digest may for example be generated by performing a check-sum, a Cyclic Redundancy Check (CRC), or some other non-reversible operation, such as a hash on the message. This digest of the message is then digitally signed by the sender using the sender's private key. The private key may be used to perform an encryption or some other transformation operation on the digest to generate a digest signature. A digital signature, including the digest and the digest signature, is then appended to the outgoing message. In addition, a digital Certificate (Cert) of the sender, which includes the sender's public key and sender identity information that is bound to the public key with one or more digital signatures, and possibly any chained Certs and Certificate Revocation Lists (CRLs) associated with the Cert and any chained Certs may also be included with the outgoing message.

The secure e-mail message 40 sent by the e-mail sender 30 may include a component 42 including the sender's Cert, Cert chain, CRLs and digital signature and the signed message body 44. In the S/MIME secure messaging technique, Certs, CRLs and digital signatures are normally placed at the beginning of a message as shown in FIG. 2, and the message body is included in a file attachment. Messages generated by other secure messaging schemes may place message components in a different order than shown or include additional and/or different components. For example, a signed message 40 may include addressing information, such as "To:" and "From:" email addresses, and other header information.

When the secure e-mail message 40 is sent from the e-mail sender 30, it is routed through the WAN 32 to the wireless gateway 34. As described above, the e-mail sender 30 may send the message 40 directly to a wireless gateway 34, or the message may instead be delivered to a computer system associated with the mobile device 38 and then sent to the mobile device 38 through the wireless gateway 34. Alternatively, the message may be routed or redirected to the mobile device 38 through the wireless network 36 via a wireless VPN router.

The receiver of such a signed message 40, mobile device 38, may verify a digital signature 42 in the secure message 40 by generating a digest of the message body 44, extracting the transmitted digest from the digital signature 42, comparing the generated digest with the digest extracted from the digital signature 42, and verifying the digest signature in the digital signature. The digest algorithm used by a secure message receiver is the same as the algorithm used by the message sender, and may be specified in a message header, or possibly in a digital signature of the secure message. One commonly used digest algorithm is the Secure Hashing Algorithm 1 (SHA1), although other digest algorithms such as Message-Digest Algorithm 5 (MD5) may also be used. If a secure message 40 was encrypted by a sender 30 after being signed, then the receiver 38 would first decrypt the message before signature verification is performed. If encryption was performed before signing, however, decryption is not required before signature verification.

In order to verify the digest signature, the receiver 38 retrieves the public key of the sender 30, generally by extracting the public key from the sender's Cert 42 attached to the message 40, and then by verifying the signature on the digest in the digital signature by performing a reverse transformation on the digest signature. For example, if the message sender 30 generated the digest signature by encrypting the digest using its private key, then a receiver 38 would use the sender's public key to decrypt the digest signature to recover the original digest. The secure message 40 shown in FIG. 2 includes the sender's Cert 42, from which the sender's public key can be extracted. The sender's public key may also be retrieved from a local store, for example where the public key was extracted from an earlier message from the sender 30 and stored in a key store in the receiver's local store. Alternatively, the public key may be retrieved from the sender's Cert stored in a local store, or from a Public Key Server (PKS). A PKS is a server that is normally associated with a Certificate Authority (CA) from which a Cert for an entity, including the entity's public key, is available. A PKS might reside within a corporate LAN such as 18 (FIG. 1), or anywhere on the WAN 32, Internet or other network or system through which message receivers may establish communications with the PKS.

A digest algorithm is generally a non-reversible function that produces a unique output for every unique input. Thus, if an original message is changed or corrupted, then the digest generated by the receiver will be different from the digest extracted from the digital signature, and signature verification will fail. Because digest algorithms are publicly known, however, it is possible that an entity may alter a secure message, generate a new digest of the altered message, and forward the altered message to any addressed message receivers. In this case, the digest generated at the receiver on the basis of the altered message will match the new digest that was added by the entity that altered the message. The digest signature check is intended to prevent verification of a digital signature in such a situation. Although the generated and new digests will match, because a sender signs the original digest using its own private key, the entity that altered the message cannot generate a new digest signature that can be verified with the sender's private key. Therefore, even though the digests in the altered message match, the digital signature will not be verified since the digest signature verification will fail.

These mathematical operations do not prevent anyone from seeing the contents of the secure message 40, but do ensure that the message has not been tampered with after it was signed by the sender, and also ensure that the message was signed by the person as indicated on the 'From' field of the message.

The Cert, Cert chain and CRLs 42 are used by a receiver to ensure that the sender's Cert is valid, i.e., that the Cert has not been revoked or expired, and is trusted. A Cert is often part of a Cert chain, which includes a user's Cert as well as other Certs to verify that the user's Cert is authentic. For example, a Cert for any particular entity typically includes the entity's public key and identification information that is bound to the public key with a digital signature. Several types of Cert currently in use include, for example, X.509 Certs, which are typically used in S/MIME, and PGP Certs, which have a slightly different format. The present invention may be used with any of these types of Certs, as well as other types of Certs. The digital signature in a Cert is generated by the issuer of the Cert, and can be checked by a message receiver as described above. A Cert may include an expiry time or validity period from which a messaging client may determine if the Cert has expired. Each Cert may also be checked against a CRL to ensure that the Cert has not been revoked.

If the digital signature in a message sender's Cert is verified, the Cert has not expired or been revoked and the issuer of the Cert is trusted by a message receiver, then the digital signature of the message is trusted by the message receiver. If the issuer of the Cert is not trusted, then the message receiver may trace a certification path through the Cert chain to verify that each Cert in the chain was signed by its issuer, whose Cert is next in the Cert chain, until a Cert is found that was signed by a root Cert from a trusted source, such as from a large PKS. Once a root Cert is found, then a signature can be trusted, because both the sender and receiver trust the source of the root Cert.

In known secure messaging systems, the overall result of the above mathematical operations and trust status check are presented to a user as a single valid/invalid signature indication. This single indication does not provide adequate information to a receiver to determine why the verification of the digital signature has failed.

Figure 3:
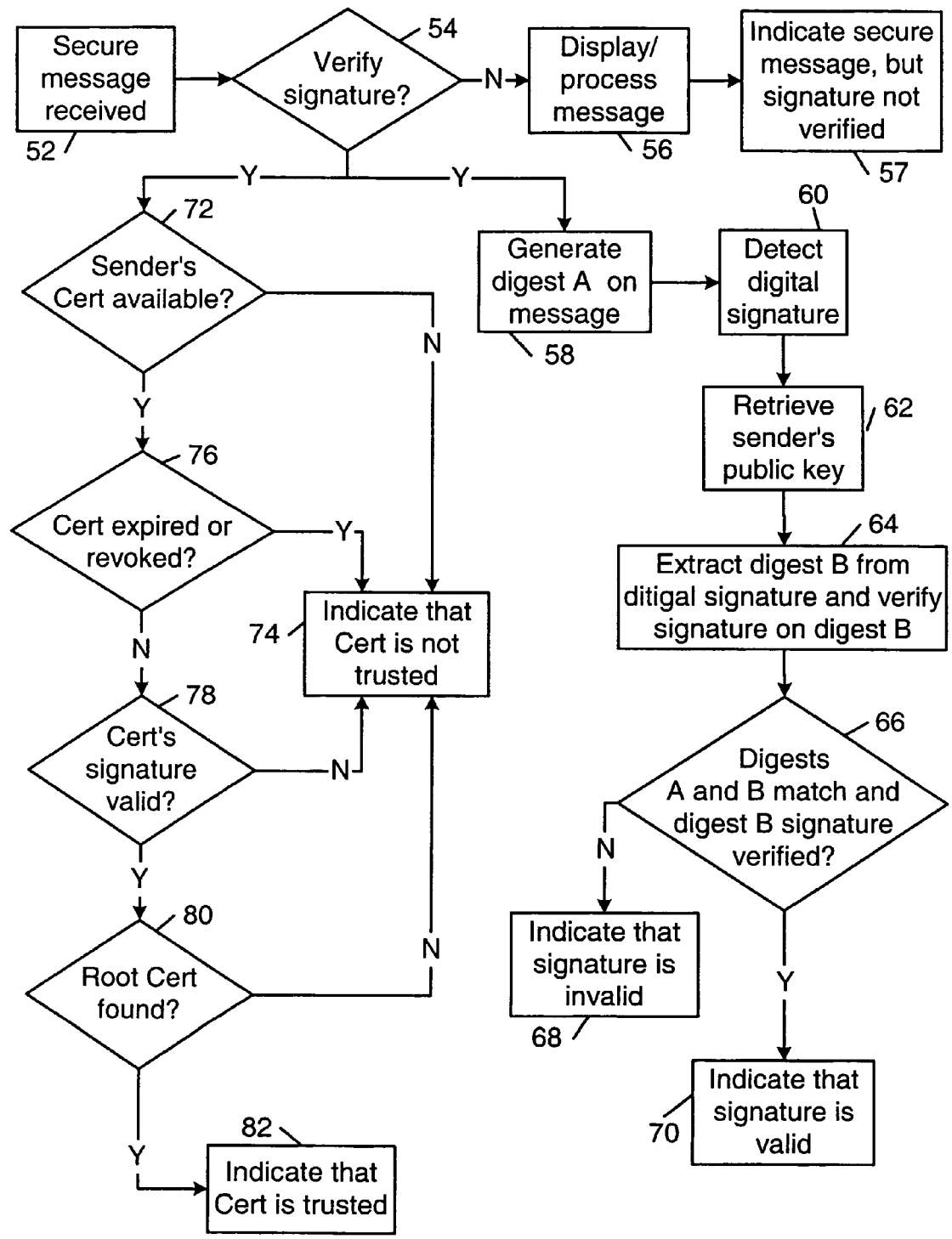
FIG. 3 is a flow chart illustrating a method for digital signature status and trust status checking and indication for a secure message.

FIG. 3 is a flow chart illustrating a method for digital signature status and trust status verification and indication for a secure message. Although the method in FIG. 3 shows operations for verifying signature and trust status of a secure message, a messaging client in which such a method is implemented may also be enabled for unsecure communications. The steps shown in FIG. 3 can be executed when a user of a messaging client wishes to verify a signature and preferably do not affect other functions of a messaging client or a system on which a messaging client is operating.

The method begins at step 52 when a secure message is received by a messaging client, such as the mobile device 38 of FIG. 2. Because the content of a secure message may be viewed without verifying its digital signature, a user may be prompted, for example, when a secure message is accessed for display or other processing, to choose whether or not the digital signature should be verified. Configuration settings may also be established at a messaging client to automatically control signature verification. For example, digital signatures on secure messages from certain senders may be verified every time such a secure message is selected for display or processing on a messaging client, whereas a user would be prompted when any other secure message is selected for display or processing. At step 54, a determination is made as to whether or not the digital signature on the secure message is to be verified, which is dependent upon a user selection, configuration settings, or both. If the digital signature is not to be verified, then the message is displayed or processed at step 56. An indication that the message is a secure message, but that its digital signature was not verified or processed may also be provided at step 57. Alternatively, a messaging client could be configured to abort any display and processing operations for a secure message unless its digital signature is verified.

If the signature is to be verified, then mathematical operations and trust check operations are performed. These operations may be performed in any order, or substantially in parallel as shown in FIG. 3. The mathematical operations involved in signature verification, shown on the right-hand side of FIG. 3, begin at step 58, where the messaging client generates a digest A of the body of the received secure message. Then, at step 60, the digital signature of the secure message is detected, and the sender's public key is retrieved from a local store, from an attached Cert, or from an external source, such as a PKS. The digest B, which was generated by the message sender, is then extracted from the digital signature at step 64. The two digests, A and B, are then compared and the digest B signature is checked at step 66. If the digests match and the digest signature is verified, then an indication that the digital signature is valid is provided at step 68. Otherwise, an indication that the signature is invalid is provided, at step 70. Each of these indications may be, for example, text, an icon, or some combination of both, for display on a display screen associated with the messaging client.

Trust status checking operations begin at step 72, where the messaging client determines if the sender's Cert is available. Because a sender may attach its Cert to any secure messages that it signs, the sender's Cert will normally be available to a messaging client. If, however, the Cert is not attached to the message or stored at the receiving messaging client, and cannot be retrieved from an external source, then trust between the sender and receiver cannot be established and an indication that the Cert is not trusted is provided at step 74. This indication is separate from the indication provided at step 68 or 70 and thereby allows a user to determine whether the mathematical operations, trust status operations, or both, have failed.

If the sender's Cert is available, however, then an expiry time, validity period or any other further similar information in the Cert is checked at step 76 to determine if the Cert is expired. An appropriate CRL for the Cert is also preferably checked to determine if the Cert has been revoked. An expired or revoked Cert results in an untrusted Cert indication at step 76. If the Cert has not expired or been revoked, then the Cert issuer's signature can be checked, and at step 78, it is determined whether or not the issuer's signature in the Cert is valid. If it is not valid, then the Cert cannot be trusted and the method proceeds to step 74 to provide an indication that the Cert is not trusted. Steps 72, 76 and 78 may be repeated, if necessary, for each Cert in a Cert chain until either one of the chained Certs is found to be missing, expired or revoked or has an invalid signature, in which case an untrusted Cert indication is provided at step 74, or a root Cert is found. If the entire Cert chain has been processed and no root Cert has been found, as determined at step 80, then trust cannot be established and an untrusted Cert indication is provided at step 74. If a root Cert is found (step 80), then the method continues to step 82, and an indication that the Cert is trusted is provided. This is a separate indication from the digital signature status indication at step 68 or 70 and a different indication than would be provided at step 74.

Thus, two separate indications are provided, one for signature status and one for trust status. Each of the indications may have one of multiple states, dependent upon the results of the corresponding operations, as described in further detail below.

The operations shown on FIG. 3 may be performed in a different order. For example, digests A and B could be compared before the public key is retrieved. Also, although the digest comparison and digest signature verification operations have been shown together in steps 64 and 66, these operations may be performed sequentially, so that the digest signature is verified only if digests A and B match, or the digests are compared only if the digest signature is verified. In addition, the trust status checking operations may be performed in a different order than shown, depending upon user preferences, standard practices and possibly the processing resources available on a messaging client. For example, a processing-constrained messaging client may delay performing a CRL check until a root Cert is found, thereby avoiding this processor-intensive and time-consuming operation unless a certification path to a trusted root Cert is found. Signature and trust status operations may also be interdependent, such that one set of operations may be performed only if the other is successfully completed, or a failure of either the signature or trust status operations interrupts and aborts the other operations.

The method shown in FIG. 3 shows only the steps involved in determining signature status and trust status of a secure message. If a secure message was encrypted or otherwise processed by encoding, for example, by a sender after it was signed, then a receiving messaging client will perform corresponding inverse operations before signature verification operations are performed. Such further processing operations may also be performed after the operations in FIG. 3 are completed.

Any one of several alternative schemes may be implemented for displaying or processing a secure message when it is determined at step 54 that a message signature is to be verified. Since a valid signature is not required to view or process the content of a secure message, message content may be displayed or otherwise processed while signature status and trust status operations shown in FIG. 3 are being performed. The signature and trust status indications may then be displayed when the associated operations have been completed. Message display and processing may also be delayed until signature and/or trust status verification is complete. If either of these status verification fails, then a user may be prompted to indicate whether or not message-related operations should proceed, despite an invalid signature and/or untrusted Cert.

In either of the above schemes, "in progress" or similar indications are preferably displayed by a messaging client while signature and trust status operations are being performed. Since separate signature status and trust status indications are provided when signature- and Cert-related operations are complete, separate "in progress" indications may also be provided.

Although a single step 74 is shown in FIG. 3 to indicate that a Cert is not trusted, more than one type of untrusted Cert indication is preferably provided. Different indications are preferably provided for a revoked Cert, an expired Cert, a missing Cert and an invalid Cert (i.e., a Cert with an invalid signature), in order to provide a user with even more detailed information regarding why a Cert is not trusted. Such untrusted Cert indications may relate to either the sender's Cert or a Cert in a Cert chain. Another different indication may be provided when a complete Cert chain has been processed without finding a root Cert. In each of these cases, a user may be prompted to invoke a further operation. For example, when no root Cert is found, a user may choose to designate the sender's Cert or a Cert in a Cert chain as a trusted root Cert, whereas if a Cert is missing, then the user may submit a command to retrieve the missing Cert.

Figure 4:
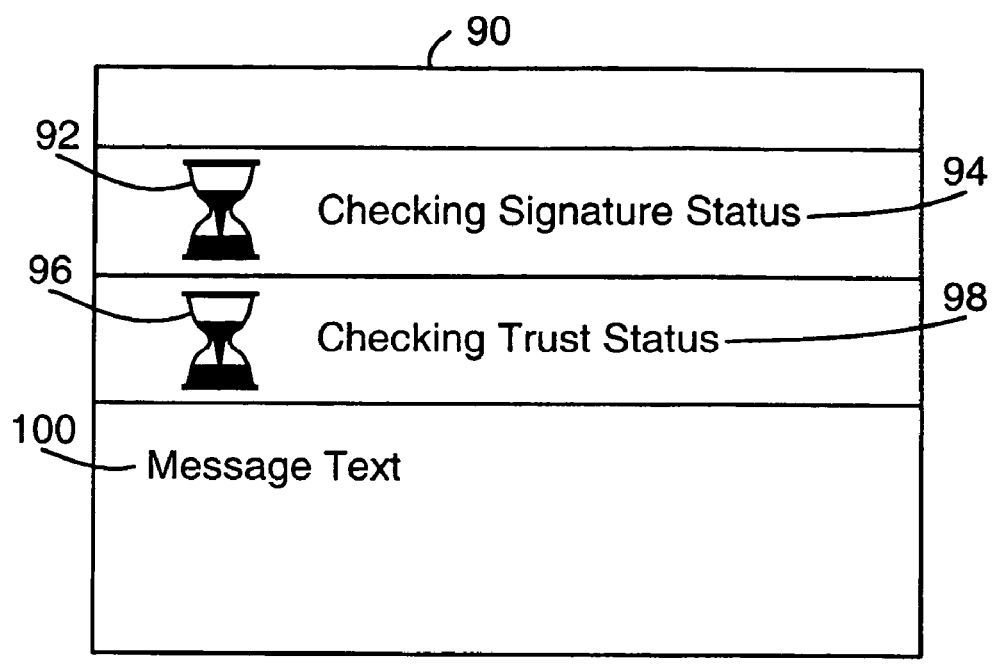
FIG. 4 is a diagram of a messaging client display screen.

FIG. 4 is a diagram of a messaging client display screen. This screen illustrates example "in progress" indications. When a secure message is selected for display or other processing, a display screen 90 on a messaging client may appear similar to the representation shown in FIG. 4.

In the example of FIG. 4, a secure message has been selected for display and the digital signature on the message is to be verified. While signature and trust status verification operations are in progress, suitable indicators are preferably displayed, as shown at 92, 94, 96 and 98. Each "in progress" indicator may include both an icon 92, 96 and related text 94, 98. The hourglass icons 92, 96 shown in FIG. 4 are used to indicate that operations are in progress. The text shown at 94 and 98 in FIG. 4 provide further information to a user regarding the particular operations that are currently being executed. As also shown in FIG. 4, message text 100 may be displayed while the signature status and trust status of a secure message are being verified.

Figure 5:
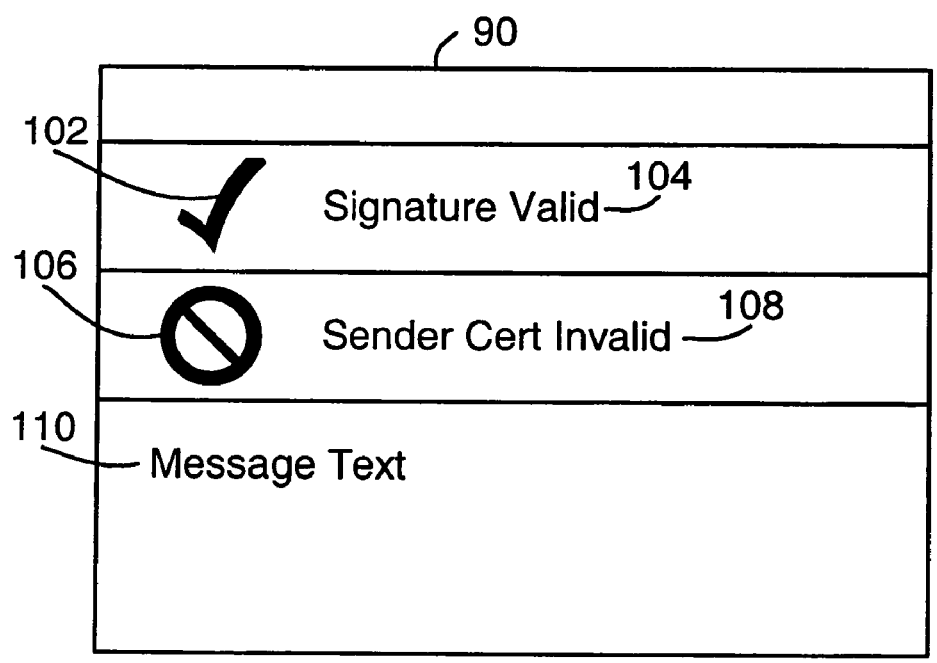
FIG. 5 is a diagram of the messaging client display screen illustrating signature status and trust status indications.

FIG. 5 is a diagram of the messaging client display screen illustrating signature status and trust status indications. In FIG. 5, the signature status and trust status operations for a secure message have been completed, and separate indicators of the results of signature verification and trust verification are displayed. The signature status indicator and trust status indicator, like the "in progress" indicators in FIG. 4, preferably include both an icon 102, 106 and text 104, 108. The icons 102, 106 allow a user to quickly and easily determine the signature status and trust status of a secure message, while the text 104, 108 provides further information. In the example of FIG. 5, the trust status verification has failed because the sender Cert was found to be invalid. The message text 110 may still be viewed by a user, but the user is not assured that the message text 110 is actually what the message sender sent, or that the message was actually sent by the sender. As described above, when either of the verification operations fails, a user may be prompted for any further action to be performed.

FIGS. 4 and 5 respectively show a messaging client display screen 90 at "in progress" and "completed" states of signature and trust verification operations. Since these operations involve different amounts of processing and thus may require different amounts of time to complete, it is possible that a completed indication for one of the operations may be displayed while the other operation remains in progress. As described above, it is also possible that failure of one of the operations causes the other operation to abort, and another set of corresponding icons and/or text indications may be provided.

Other icons and text indicators may be used in addition to or instead of those shown in FIGS. 4 and 5, which are illustrative examples of status indicators that may be used.

Figure 6:
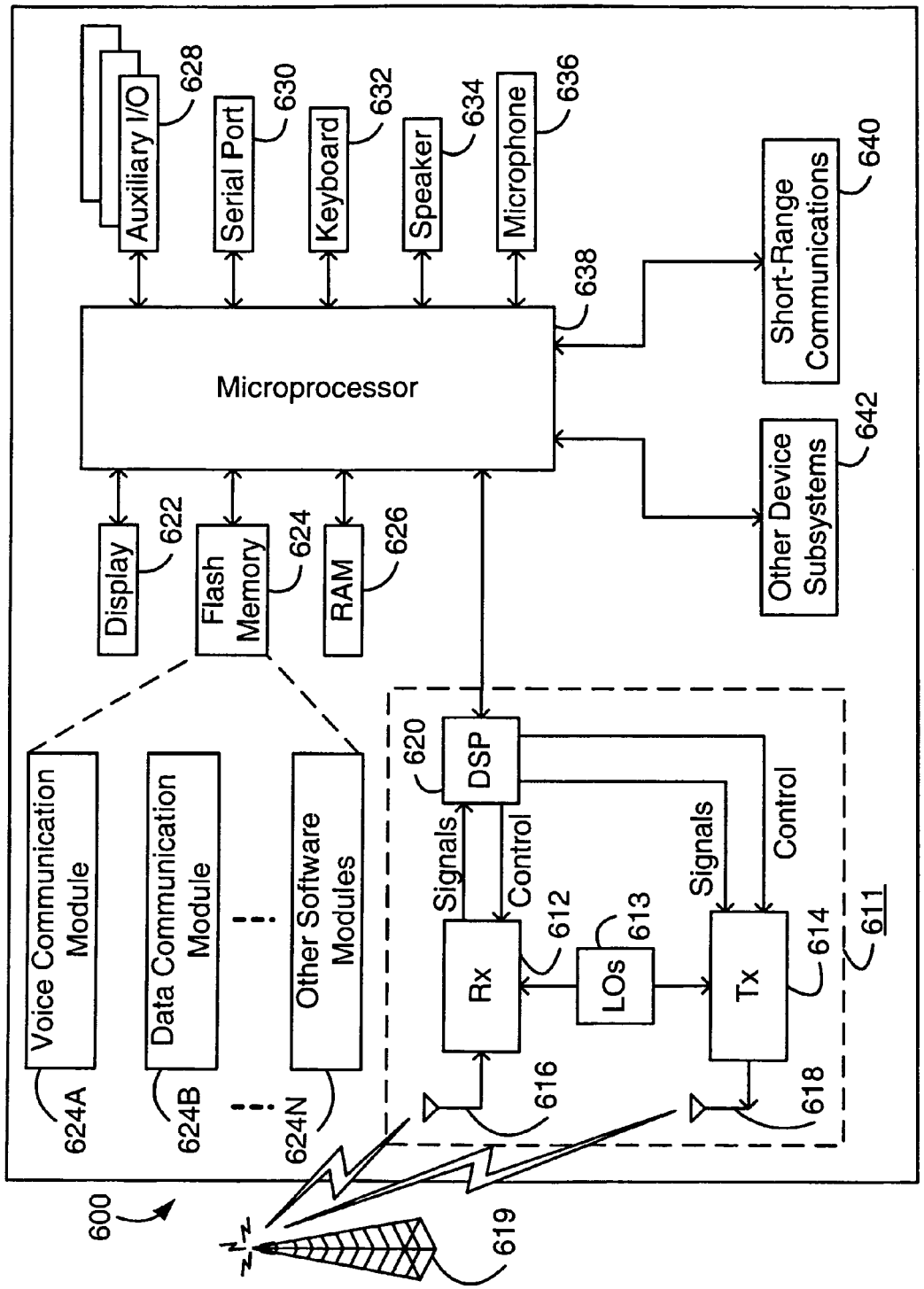
FIG. 6 is a block diagram of a wireless mobile communication device on which a messaging client which implements the present invention may operate.

FIG. 6 is a block diagram of a wireless mobile communication device on which a messaging client which may implement the present invention may operate. The mobile device 600 is preferably a two-way communication device having at least voice and data communication capabilities. The device preferably has the capability to communicate with other computer systems on the Internet. Depending on the functionality provided by the device, the device may be referred to as a data messaging device, a two-way pager, a cellular telephone with data messaging capabilities, a wireless Internet appliance or a data communication device (with or without telephony capabilities).

The dual-mode device 600 includes a transceiver 611, a microprocessor 638, a display 622, Flash memory 624, RAM 626, auxiliary input/output (I/O) devices 628, a serial port 630, a keyboard 632, a speaker 634, a microphone 636, a short-range wireless communications sub-system 640, and may also include other device sub-systems 642. The transceiver 611 preferably includes transmit and receive antennas 616, 618, a receiver (Rx) 612, a transmitter (Tx) 614, one or more local oscillators (LOs) 613, and a digital signal processor (DSP) 620. Within the Flash memory 624, the device 100 preferably includes a plurality of software modules 624A-624N that can be executed by the microprocessor 638 (and/or the DSP 620), including a voice communication module 624A, a data communication module 624B, and a plurality of other operational modules 624N for carrying out a plurality of other functions.

The mobile communication device 600 is preferably a two-way communication device having voice and data communication capabilities. Thus, for example, the device may communicate over a voice network, such as any of the analog or digital cellular networks, and may also communicate over a data network. The voice and data networks are depicted in FIG. 6 by the communication tower 619. These voice and data networks may be separate communication networks using separate infrastructure, such as base stations, network controllers, etc., or they may be integrated into a single wireless network.

The communication subsystem 611 is used to communicate with the network 619. The DSP 620 is used to send and receive communication signals to and from the transmitter 614 and receiver 612, and may also exchange control information with the transmitter 614 and receiver 612. If the voice and data communications occur at a single frequency, or closely-spaced set of frequencies, then a single LO 613 may be used in conjunction with the transmitter 614 and receiver 612. Alternatively, if different frequencies are utilized for voice communications versus data communications, then a plurality of LOs 613 can be used to generate a plurality of frequencies corresponding to the network 619. Although two antennas 616, 618 are depicted in FIG. 6, the mobile device 600 could be used with a single antenna structure. Information, which includes both voice and data information, is communicated to and from the communication module 611 via a link between the DSP 620 and the microprocessor 638.

The detailed design of the communication subsystem 611, such as frequency band, component selection, power level, etc., will be dependent upon the communication network 619 in which the mobile device 600 is intended to operate. For example, a mobile device 600 intended to operate in a North American market may include a communication subsystem 611 designed to operate with the Mobitex or DataTAC mobile data communication networks and also designed to operated with any of a variety of voice communication networks, such as AMPS, TDMA, CDMA, PCS, etc., whereas a mobile device 600 intended for use in Europe may be configured to operate with the GPRS data communication network and the GSM voice communication network. Other types of data and voice networks, both separate and integrated, may also be utilized with the mobile device 600.

Depending upon the type of network 619, the access requirements for the dual-mode mobile device 600 may also vary. For example, in the Mobitex and DataTAC data networks, mobile devices are registered on the network using a unique identification number associated with each device. In GPRS data networks, however, network access is associated with a subscriber or user of a mobile device 600. A GPRS device typically requires a subscriber identity module ("SIM"), which is required in order to operate the mobile device 600 on a GPRS network. Local or non-network communication functions (if any) may be operable, without the SIM, but the mobile device 600 will be unable to carry out any functions involving communications over the network 619, other than any legally required operations, such as '911' emergency calling.

After any required network registration or activation procedures have been completed, the mobile device 600 may send and receive communication signals, preferably including both voice and data signals, over the network 619. Signals received by the antenna 616 from the communication network 619 are routed to the receiver 612, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 620. In a similar manner, signals to be transmitted to the network 619 are processed, including modulation and encoding, for example, by the DSP 620 and are then provided to the transmitter 614 for digital to analog conversion, frequency up conversion, filtering, amplification and transmission to the communication network 619 via the antenna 618. Although a single transceiver 611 is shown in FIG. 6 for both voice and data communications, the mobile device 600 may include two distinct transceivers, a first transceiver for transmitting and receiving voice signals, and a second transceiver for transmitting and receiving data signals.

In addition to processing the communication signals, the DSP 620 may also provide for receiver and transmitter control. For example, the gain levels applied to communication signals in the receiver 612 and transmitter 614 may be adaptively controlled through automatic gain control algorithms implemented in the DSP 620. Other transceiver control algorithms could also be implemented in the DSP 620 in order to provide more sophisticated control of the transceiver 611.

The microprocessor 638 preferably manages and controls the overall operation of the mobile device 600. Many types of microprocessors or microcontrollers could be used for this part, or, alternatively, a single DSP 620 could be used to carry out the functions of the microprocessor 638. Low-level communication functions, including at least data and voice communications, are performed through the DSP 620 in the transceiver 611. Other, high-level communication applications, such as a voice communication application 624A, and a data communication application 624B may be stored in the Flash memory 624 for execution by the microprocessor 638. For example, the voice communication module 624A may provide a high-level user interface operable to transmit and receive voice calls between the mobile device 600 and a plurality of other voice devices via the network 619. Similarly, the data communication module 624B may provide a high-level user interface operable for sending and receiving data, such as e-mail messages, files, organizer information, short text messages, etc., between the mobile device 600 and a plurality of other data devices via the network 619. On the mobile device 600, a secure messaging software application may operate in conjunction with the data communication module 624B in order to implement the signature and trust verification techniques described above.

The microprocessor 638 also interacts with other device subsystems, such as the display 622, Flash memory 624, random access memory (RAM) 626, auxiliary input/output (I/O) subsystems 628, serial port 630, keyboard 632, speaker 634, microphone 636, a short-range communications subsystem 640 and any other device subsystems generally designated as 642. For example, the modules 624A-N are executed by the microprocessor 638 and may provide a high-level interface between a user of the mobile device and the mobile device. This interface typically includes a graphical component provided through the display 622, and an input/output component provided through the auxiliary I/O 628, keyboard 632, speaker 634, or microphone 636.

Some of the subsystems shown in FIG. 6 perform communication-related functions, whereas other subsystems may provide "resident" or on-device functions. Notably, some subsystems, such as keyboard 632 and display 622 may be used for both communication-related functions, such as entering a text message for transmission over a data communication network, and device-resident functions such as a calculator or task list or other PDA type functions.

Operating system software used by the microprocessor 638 is preferably stored in a persistent store such as Flash memory 624. In addition to the operating system and communication modules 624A-N, the Flash memory 624 may also include a file system for storing data. A storage area is also preferably provided in the Flash memory 624 to store public keys, a private key, and other information required for secure messaging. The operating system, specific device applications or modules, or parts thereof, may be temporarily loaded into a volatile store, such as RAM 626 for faster operation. Moreover, received communication signals may also be temporarily stored to RAM 626 before permanently writing them to a file system located in the persistent store 624.

An exemplary application module 624N that may be loaded onto the dual-mode device 100 is a personal information manager (PIM) application providing PDA functionality, such as calendar events, appointments, and task items. This module 624N may also interact with the voice communication module 624A for managing phone calls, voice mails, etc., and may also interact with the data communication module 624B for managing e-mail communications and other data transmissions. Alternatively, all of the functionality of the voice communication module 624A and the data communication module 624B may be integrated into the PIM module.

The Flash memory 624 preferably provides a file system to facilitate storage of PIM data items on the device. The PIM application preferably includes the ability to send and receive data items, either by itself, or in conjunction with the voice and data communication modules 624A, 624B, via the wireless network 619. The PIM data items are preferably seamlessly integrated, synchronized and updated, via the wireless network 619, with a corresponding set of data items stored or associated with a host computer system, thereby creating a mirrored system for data items associated with a particular user.

The mobile device 600 may also be manually synchronized with a host system by placing the mobile device 600 in an interface cradle, which couples the serial port 630 of the mobile device 600 to the serial port of the host system. The serial port 630 may also be used to enable a user to set preferences through an external device or software application, to download other application modules 624N for installation, and to load Certs, keys and other information onto a device as described above. This wired download path may be used to load an encryption key onto the device, which is a more secure method than exchanging encryption information via the wireless network 619.

Additional application modules 624N may be loaded onto the mobile device 600 through the network 619, through an auxiliary I/O subsystem 628, through the serial port 630, through the short-range communications subsystem 640, or through any other suitable subsystem 642, and installed by a user in the Flash memory 624 or RAM 626. Such flexibility in application installation increases the functionality of the mobile device 600 and may provide enhanced on-device functions, communication-related functions, or both. For example, secure communication applications may enable electronic commerce functions and other such financial transactions to be performed using the mobile device 600.

When the mobile device 600 is operating in a data communication mode, a received signal, such as a text message or a web page download, will be processed by the transceiver 611 and provided to the microprocessor 638, which will preferably further process the received signal for output to the display 622, or, alternatively, to an auxiliary I/O device 628. A received secure message would be processed as described above. A user of mobile device 600 may also compose data items, such as email messages, using the keyboard 632, which is preferably a complete alphanumeric keyboard laid out in the QWERTY style, although other styles of complete alphanumeric keyboards such as the known DVORAK style may also be used. User input to the mobile device 600 is further enhanced with a plurality of auxiliary I/O devices 628, which may include a thumbwheel input device, a touchpad, a variety of switches, a rocker input switch, etc. The composed data items input by the user may then be transmitted over the communication network 619 via the transceiver 611. Secure messages received by and to be transmitted from the mobile device 600 are processed by the data communication module 624B or an associated secure messaging software application according to the techniques described above.

When the mobile device 600 is operating in a voice communication mode, the overall operation of the mobile device 600 is substantially similar to the data mode, except that received signals are preferably output to the speaker 634 and voice signals for transmission are generated by a microphone 636. Alternative voice or audio I/O subsystems, such as a voice message recording subsystem, may also be implemented on the mobile device 600. Although voice or audio signal output is preferably accomplished primarily through the speaker 634, the display 622 may also be used to provide an indication of the identity of a calling party, the duration of a voice call, or other voice call related information. For example, the microprocessor 638, in conjunction with the voice communication module 624A and the operating system software, may detect the caller identification information of an incoming voice call and display it on the display 622.

A short-range communications subsystem 640 may also be included in the dual-mode device 600. For example, the subsystem 640 may include an infrared device and associated circuits and components, or a Bluetooth™ short-range wireless communication module to provide for communication with similarly-enabled systems and devices.

The above description relates to one example of the present invention. Many variations will be apparent to those knowledgeable in the field, and such variations are within the scope of the application.

For example, although a wireless mobile communication device is shown in FIG. 6 and described as one possible messaging client, the invention may also be implemented in other messaging clients, including desktop and laptop computer systems, networked computer systems and other types of messaging clients.

What is claimed as the invention is:

1. A computer readable medium that stores encoded software instructions, the software when executed implementing a method for indicating signature status and trust status of a secure message on a messaging client, said method comprising:

selecting for processing a secure message stored on the messaging client, the secure message including a digital signature generated by a sender of the secure message;

checking the digital signature;

checking trust status of the sender;

displaying a first indicator of a result of the step of checking the digital signature; and displaying a second indicator of a result of the step of checking trust status of the sender;

wherein:

the secure message includes a message body;

the method further comprises the step of processing the message body;

the step of checking the digital signature comprises determining whether the digital signature is valid or invalid;

the step of checking trust status comprises determining whether the sender is trusted or untrusted; and the step of processing is performed only if the digital signature is valid and the sender is trusted.

2. The medium of claim 1, wherein the step of processing the secure message comprises displaying the message body on a display screen on the messaging client.

3. The medium of claim 1, wherein the first indicator includes a valid signature indication and an invalid signature indication.

4. The medium of claim 3, wherein the second indicator includes a trusted indication and an untrusted indication.

5. The medium of claim 4, wherein the first and second indicators comprise an icon.

6. The medium of claim 4, wherein the first and second indicators comprise text.

7. The medium of claim 5, wherein the first and second indicators further comprise text.

8. The medium of claim 4, wherein the second indicator comprises a plurality of untrusted indications.

9. The medium of claim 8, wherein the plurality of untrusted indications includes an invalid Certificate (Cert) indication, a revoked Cert indication, a missing Cert indication, and an expired Cert indication.

10. The medium of claim 1, wherein:

the digital signature includes a digest and a digest signature; and the step of checking the digital signature comprises the steps of:

generating a digest of a message body of the secure message;

extracting a digest from the digital signature;

comparing the generated and extracted digests;

checking a digest signature in the digital signature to determine if the digest signature is valid or invalid; and determining that the digital signature is valid when the generated and extracted digests match and the digest signature is valid.

11. The medium of claim 10, wherein:

the secure message also includes a Certificate (Cert) of the sender, the Cert including sender identity information and a public key bound to the sender identity information by a Cert signature generated by an issuer of the Cert; and the step of checking trust status of the sender comprises the steps of:

checking the Cert signature to determine if the Cert signature is valid or invalid;

if the Cert signature is invalid, then determining that the sender is untrusted; and if the Cert signature is valid, then
  determining whether the issuer of the Cert is a trusted entity;
  if the issuer is a trusted entity, then determining that the sender is trusted;
  if the issuer is not a trusted entity, then
    repeating the steps of checking the Cert signature and determining whether the issuer of the Cert is a trusted entity for each Cert in a Cert chain associated with the Cert of the sender to determine if a valid certification path to a valid root Cert from a trusted entity exists in the chain; and
    if a valid certification path to a valid root Cert exists in the chain, then
    determining that the sender is trusted.

12. The medium of claim 11, wherein:
the step of checking trust status of the sender further comprises the steps of:
  determining if the Cert of the sender is missing from the secure message and if so, determining that the sender is untrusted;
  determining if the Cert of the sender is expired and if so, determining that the sender is untrusted; and
  checking a Certificate Revocation List (CRL) to determine if the Cert of the sender has been revoked and if so, determining that the sender is untrusted; and
the step of repeating the steps of checking and determining further comprises repeating the steps of determining if a Cert is expired and checking a CRL.

13. The medium of claim 12, wherein the messaging client is operating on a wireless mobile communication device.

14. The medium of claim 12, wherein the messaging client is operating on a personal computer system.

15. A computer readable medium that stores encoded software instructions, the software when executed implementing a method for indicating signature status and trust status of a secure message on a messaging client, comprising:
  selecting for processing a secure message stored on the messaging client, the secure message including a digital signature generated by a sender of the secure message;
  checking the digital signature;
  checking trust status of the sender;
  displaying a first indicator of a result of the step of checking the digital signature; and
  displaying a second indicator of a result of the step of checking trust status of the sender;
  wherein:
    the secure message includes a message body;
    the method further comprises the step of processing the message body;
    the step of checking the digital signature comprises determining whether the digital signature is valid or invalid;
    the step of checking trust status comprises determining whether the sender is trusted or untrusted; and
    the first indicator includes a valid signature indication and an invalid signature indication.

16. The medium of claim 15, wherein the step of processing the secure message comprises displaying the message body on a display screen on the messaging client.

17. The medium of claim 15, wherein the second indicator comprises a plurality of untrusted indications.

18. The medium of claim 17, wherein the plurality of untrusted indications includes an invalid Certificate (Cert) indication, a revoked Cert indication, a missing Cert indication, and an expired Cert indication.

19. The medium of claim 15, wherein:
the digital signature includes a digest and a digest signature; and
the step of checking the digital signature comprises the steps of:
  generating a digest of a message body of the secure message;
  extracting a digest from the digital signature;
  comparing the generated and extracted digests;
  checking a digest signature in the digital signature to determine if the digest signature is valid or invalid; and
  determining that the digital signature is valid when the generated and extracted digests match and the digest signature is valid.

20. The medium of claim 15, wherein:
the secure message also includes a Certificate (Cert) of the sender, the Cert including sender identity information and a public key bound to the sender identity information by a Cert signature generated by an issuer of the Cert; and
the step of checking trust status of the sender comprises the steps of:
  checking the Cert signature to determine if the Cert signature is valid or invalid;
  if the Cert signature is invalid, then determining that the sender is untrusted; and
  if the Cert signature is valid, then
    determining whether the issuer of the Cert is a trusted entity;
    if the issuer is a trusted entity, then determining that the sender is trusted;
    if the issuer is not a trusted entity, then
      repeating the steps of checking the Cert signature and determining whether the issuer of the Cert is a trusted entity for each Cert in a Cert chain associated with the Cert of the sender to determine if a valid certification path to a valid root Cert from a trusted entity exists in the chain; and
      if a valid certification path to a valid root Cert exists in the chain, then determining that the sender is trusted.

21. The medium of claim 20, wherein:
the step of checking trust status of the sender further comprises the steps of:
  determining if the Cert of the sender is missing from the secure message and if so, determining that the sender is untrusted;
  determining if the Cert of the sender is expired and if so, determining that the sender is untrusted; and
  checking a Certificate Revocation List (CRL) to determine if the Cert of the sender has been revoked and if so, determining that the sender is untrusted; and
the step of repeating the steps of checking and determining further comprises repeating the steps of determining if a Cert is expired and checking a CRL.

22. A computer readable medium that stores encoded software instructions, the software when executed implementing a method for indicating signature status and trust status of a secure message on a messaging client, comprising:
  selecting for processing a secure message stored on the messaging client, the secure message including a digital signature generated by a sender of the secure message;
  checking the digital signature;
  checking trust status of the sender;
  displaying a first indicator of a result of the step of checking the digital signature; and displaying a second indicator of a result of the step of checking trust status of the sender;
wherein:
the secure message includes a message body;
the method further comprises the step of processing the message body
the step of checking the digital signature comprises determining whether the digital signature is valid or invalid;
the step of checking trust status comprises determining whether the sender is trusted or untrusted;
the digital signature includes a digest and a digest signature; and
the step of checking the digital signature comprises the steps of:
generating a digest of a message body of the secure message;
extracting a digest from the digital signature;
comparing the generated and extracted digests;
checking a digest signature in the digital signature to determine if the digest signature is valid or invalid; and
determining that the digital signature is valid when the generated and extracted digests match and the digest signature is valid.

23. A computer readable medium that stores encoded software instructions, the software when executed implementing a method for indicating signature status and trust status of a secure message on a messaging client, the method comprising the steps of:
selecting for processing a secure message stored on the messaging client, the secure message including a digital signature generated by a sender of the secure message;
checking the digital signature;
checking trust status of the sender;
displaying a first indicator of a result of the step of checking the digital signature; and
displaying a second indicator of a result of the step of checking trust status of the sender;
wherein:
the secure message includes a message body;
the method further comprises the step of processing the message body
the step of checking the digital signature comprises determining whether the digital signature is valid or invalid;
the step of checking trust status comprises determining whether the sender is trusted or untrusted;
the secure message also includes a Certificate (Cert) of the sender, the Cert including sender identity information and a public key bound to the sender identity information by a Cert signature generated by an issuer of the Cert; and
the step of checking trust status of the sender comprises the steps of:
checking the Cert signature to determine if the Cert signature is valid or invalid;
if the Cert signature is invalid, then determining that the sender is untrusted; and
if the Cert signature is valid, then determining whether the issuer of the Cert is a trusted entity;
if the issuer is a trusted entity, then determining that the sender is trusted;
if the issuer is not a trusted entity, then repeating the steps of checking the Cert signature and determining whether the issuer of the Cert is a trusted entity for each Cert in a Cert chain associated with the Cert of the sender to determine if a valid certification path to a valid root Cert from a trusted entity exists in the chain; and
if a valid certification path to a valid root Cert exists in the chain, then determining that the sender is trusted.

24. An apparatus for indicating signature status and trust status of a secure message having a message body, comprising:
means for selecting for processing a secure message stored on the messaging client, the secure message including a digital signature generated by a sender of the secure message;
means for checking the digital signature, including means for determining whether the digital signature is valid or invalid;
means for checking trust status of the sender, including means for determining whether the sender is trusted or untrusted;
means for processing the message body
means for displaying a first indicator of a result of the step of checking the digital signature, the first indicator including a valid signature indication and an invalid signature indication; and
means for displaying a second indicator of a result of the step of checking trust status of the sender.

25. The apparatus of claim 24, wherein the second indicator comprises a plurality of untrusted indications.

26. The apparatus of claim 25, wherein the plurality of untrusted indications includes an invalid Certificate (Cert) indication, a revoked Cert indication, a missing Cert indication, and an expired Cert indication.

27. The apparatus of claim 24, wherein:
the secure message also includes a Certificate (Cert) of the sender, the Cert including sender identity information and a public key bound to the sender identity information by a Cert signature generated by an issuer of the Cert; and
the means for checking trust status of the sender comprises:
means for checking the Cert signature to determine if the Cert signature is valid or invalid, including
means for determining that the sender is untrusted if the Cert signature is determined to be invalid;
means for determining whether the issuer of the Cert is a trusted entity, if the Cert signature is determined to be valid; and means for determining that the sender is trusted, if the issuer is a trusted entity;
means for repeating the steps of checking the Cert signature and determining whether the issuer of the Cert is a trusted entity for each Cert in a Cert chain associated with the Cert of the sender to determine if a valid certification path to a valid root Cert from a trusted entity exists in the chain, if the issuer is not a trusted entity; and
means for determining that the sender is trusted if a valid certification path to a valid root Cert exists in the chain.

28. The apparatus of claim 27, wherein:
the means for checking trust status of the sender includes:
means for determining if the Cert of the sender is missing from the secure message and if so, determining that the sender is untrusted;
means for determining if the Cert of the sender is expired and if so, determining that the sender is untrusted; and means for checking a Certificate Revocation List (CRL) to determine if the Cert of the sender has been revoked and if so, determining that the sender is untrusted; and the means for repeating the steps of checking and determining further comprises means for repeating the steps of determining if a Cert is expired and checking a CRL.

29. An apparatus for indicating signature status and trust status of a secure message having a message body, comprising:

means for selecting for processing a secure message stored on the messaging client, the secure message including a digital signature generated by a sender of the secure message, the digital signature including a digest and digest signature;

means for checking the digital signature, including means for determining whether the digital signature is valid or invalid;

means for checking trust status of the sender, including means for determining whether the sender is trusted or untrusted;

means for displaying a first indicator of a result of the step of checking the digital signature;

means for displaying a second indicator of a result of the step of checking trust status of the sender; and means for processing the message body;

the means for checking the digital signature including:
 means for generating a digest of a message body of the secure message;
 means for extracting the digest from the digital signature;
 means for comparing the generated and extracted digests;
 means for checking a digest signature in the digital signature to determine if the digest signature is valid or invalid; and
 means for determining that the digital signature is valid when the generated and extracted digests match and the digest signature is valid.

30. The apparatus of claim 29, wherein the second indicator comprises a plurality of untrusted indications.

31. The apparatus of claim 30, wherein the plurality of untrusted indications includes an invalid Certificate (Cert) indication, a revoked Cert indication, a missing Cert indication, and an expired Cert indication.

32. An apparatus for displaying signature status and trust status of a secure message comprising:

means for selecting for processing a secure message stored on the messaging client, the secure message including a digital signature generated by a sender of the secure message;

means for checking the digital signature;

means for checking trust status of the sender;

means for displaying a first indicator of a result of the step of checking the digital signature; and means for displaying a second indicator of a result of the step of checking trust status of the sender;

wherein:
 the secure message includes a message body;
 the apparatus further comprises means for processing the message body;
 the means for checking the digital signature comprises means for determining whether the digital signature is valid or invalid;
 the means for checking trust status comprises means for determining whether the sender is trusted or untrusted;
 the secure message also includes a Certificate (Cert) of the sender, the Cert including sender identity information and a public key bound to the sender identity information by a Cert signature generated by an issuer of the Cert; and
 the means for checking trust status of the sender comprise:
  means for checking the Cert signature to determine if the Cert signature is valid or invalid;
  means for determining that the sender is untrusted if the Cert signature is invalid; and
  means for performing the following steps if the Cert signature is valid:
   determining whether the issuer of the Cert is a trusted entity;
   if the issuer is a trusted entity, then determining that the sender is trusted;
   if the issuer is not a trusted entity, then
    repeating the steps of checking the Cert signature and determining whether the issuer of the Cert is a trusted entity for each Cert in a Cert chain associated with the Cert of the sender to determine if a valid certification path to a valid root Cert from a trusted entity exists in the chain; and
   if a valid certification path to a valid root Cert exists in the chain, then determining that the sender is trusted.

33. A mobile communications device for transmitting and receiving a secure message and for indicating signature status and trust status of the secure message, comprising:

a microprocessor for processing the secure message stored in memory on the mobile device including a message body, the secure message including a digital signature generated by a sender of the secure message;

the microprocessor being operable to check the digital signature, including determining whether the digital signature is valid or invalid;

the microprocessor being operable to check trust status of the sender, including determining whether the sender is trusted or untrusted; and a display configured to display a first indicator of a result of checking the digital signature;

the display configured to display a second indicator of a result of the step of checking trust status of the sender;

the microprocessor processing the message body only if the digital signature is valid and the sender is trusted.

34. The mobile communications device of claim 33, wherein the second indicator comprises a plurality of untrusted indications.

35. The mobile communications device of claim 34, wherein the plurality of untrusted indications includes an invalid Certificate (Cert) indication, a revoked Cert indication, a missing Cert indication, and an expired Cert indication.

36. A method for indicating signature status and trust status of a secure message on a messaging client, comprising:

displaying a first indicator of a result of checking validity of a digital signature of the secure message;

displaying a second indicator of a result of checking trust status of a sender of the secure message; and processing a message body of the secure message only if the digital signature is valid and the sender is trusted.

* * * * *

UNITED STATES PATENT AND TRADEMARK OFFICE
CERTIFICATE OF CORRECTION

PATENT NO. : 7,483,950 B2  Page 1 of 1
APPLICATION NO. : 11/525701
DATED : January 27, 2009
INVENTOR(S) : Herbert A. Little et al.

It is certified that error appears in the above-identified patent and that said Letters Patent is hereby corrected as shown below:

In Column 20, Line 6 and 7, "comprise" should read -- comprises --.

Signed and Sealed this

Seventeenth Day of March, 2009

JOHN DOLL
*Acting Director of the United States Patent and Trademark Office*